(12) United States Patent
Jeong et al.

(10) Patent No.: US 7,750,767 B2
(45) Date of Patent: Jul. 6, 2010

(54) MICRO ELECTRO MECHANICAL SYSTEM DEVICE

(75) Inventors: Hee-moon Jeong, Yongin-si (KR); Seok-jin Kang, Yongin-si (KR); Jin-woo Cho, Yongin-si (KR); Young-chul Ko, Yongin-si (KR); Hyun-ku Jeong, Yongin-si (KR)

(73) Assignee: Samsung Electro-Mechanics Co., Ltd, Suwon-si (KR)

( * ) Notice: Subject to any disclaimer, the term of this patent is extended or adjusted under 35 U.S.C. 154(b) by 470 days.

(21) Appl. No.: 11/711,057

(22) Filed: Feb. 27, 2007

(65) Prior Publication Data

US 2008/0007376 A1    Jan. 10, 2008

(30) Foreign Application Priority Data

Jun. 14, 2006   (KR) .................... 10-2006-0053551

(51) Int. Cl.
*H01H 51/22* (2006.01)
(52) U.S. Cl. .......................... 335/78; 200/181
(58) Field of Classification Search ................. 335/78; 200/181
See application file for complete search history.

(56) References Cited

U.S. PATENT DOCUMENTS 6,819,822 B2    11/2004   Behin et al.
7,123,400 B2 *  10/2006   Murakami et al. .......... 359/298
7,287,429 B2 *  10/2007   Umemura et al. ......... 73/514.32
2009/0188325 A1 *  7/2009   Aebersold et al. ............. 73/780

FOREIGN PATENT DOCUMENTS

JP    2004-264684 A    9/2004

\* cited by examiner

*Primary Examiner*—Lincoln Donovan
*Assistant Examiner*—Bernard Rojas
(74) *Attorney, Agent, or Firm*—Sughrue Mion, PLLC

(57) ABSTRACT

A micro electro mechanical system (MEMS) device is provided. The MEMS device includes: a stage which operates in a vibration mode; an axle which supports the stage and allows rotation of the stage; and a capacitive sensor which detects rotation of the stage. The capacitive sensor includes: a sensing arm which extends from the stage; driving combs which extend from the sensing arm and rotated together with the stage; fixed combs which are fixedly supported for engagement with the driving combs, the fixed combs including surfaces overlapping opposite surfaces of the driving combs in accordance with the rotation of the driving combs; and a capacitance sensing portion which detects a capacitance change of the driving combs and the fixed combs. Therefore, the MEMS device performs precise scanning by structurally preventing deformation of the stage having a light reflecting surface.

16 Claims, 18 Drawing Sheets

Z-directional Displacement

In Effective Mirror Range

MICRO ELECTRO MECHANICAL SYSTEM DEVICE

CROSS-REFERENCE TO RELATED PATENT APPLICATIONS

This application claims priority from Korean Patent Application No. 10-2006-0053551, filed on Jun. 14, 2006, in the Korean Intellectual Property Office, the disclosure of which is incorporated herein in its entirety by reference.

BACKGROUND OF THE INVENTION

1. Field of the Invention

Apparatuses consistent with the present invention relate to a micro electro mechanical system (MEMS) device, and more particularly, to an MEMS device that performs precise scanning by structurally preventing deformation of a stage having a light reflecting surface and includes a precise sensing structure for detecting the rotation speed and direction of the stage.

2. Description of the Related Art

MEMS devices are frequently used in display devices, laser printers, precise measuring instruments, precise machining devices, etc. For example, in a display device, an MEMS device is used as an optical scanner for reflecting or deflecting a scanning light beam onto a screen.

A related art MEMS device includes a stage formed with a light reflecting surface, a driving coil wound around the light reflecting surface of the stage, and a magnet forming a magnetic field across the driving coil. During the operation of the MEMS device, the stage is rotated in a direction determined by the Lorentz law due to the interaction between a current applied to the driving coil and the magnetic field formed by the magnet, and thus light incident onto the light reflecting surface of the stage is reflected onto a screen in a predetermined scanning direction. Since the driving coil is wound around the light reflecting surface of the stage, the size and inertia mass of the driving coil increase, thereby decreasing the driving efficiency of the MEMS device. Furthermore, since the driving coil is wound around a relatively large area, the magnetic field should travel a relatively long distance. This lowers the strength of the magnetic field and causes a driving power loss.

To address these problems, the light reflecting surface is formed on a top surface of the stage, and the driving coil is formed on a bottom surface of the stage within an inner region of the light reflecting surface. However, in this case, the light reflecting surface directly receives heat generated from the lower driving coil and thus undergoes thermal deformation. Therefore, incident light is not precisely reflected from the light reflecting surface of the stage in a desired scanning direction. For this reason, there is a need for an improved structure that can increase the efficiency of the MEMS device and keep the stage flat.

Meanwhile, to realize a high-resolution display device, an optical scanner should scan a screen very precisely. For this, there is a need for a sensor that can precisely detect the rotation of a reflecting mirror of the optical scanner.

SUMMARY OF THE INVENTION

The present invention provides an MEMS device that performs precise scanning by structurally preventing deformation of a stage having a light reflecting surface.

The present invention also provides an MEMS device that includes a precise sensing structure for detecting the rotation speed and direction of a stage.

According to an aspect of the present invention, there is provided an MEMS device including: a stage which operates in a vibration mode; an axle which supports the stage and allows rotation of the stage; and a capacitive sensor which detects a rotational state of the stage, wherein the capacitive sensor includes: a sensing arm extending from an end of the stage in parallel with the axle, the sensing arm being spaced a predetermined distance from the axle; a plurality of driving combs extending from the sensing arm in a direction crossing the axle, the driving combs being rotated together with the stage; a plurality of fixed combs arranged in parallel with each other and fixedly supported at a predetermined location for engagement with the driving combs, the fixed combs including surfaces overlapping opposite surfaces of the driving combs in accordance with the rotation of the driving combs; and a capacitance sensing portion which detects a capacitance change of the driving combs and the fixed combs via the overlapping surfaces of the driving combs and the fixed combs.

According to another aspect of the present invention, there is provided an MEMS device including: a stage which operates in a vibration mode; an axle which supports the stage and allowing rotation of the stage; and a capacitive sensor which detects a rotational state of the stage, wherein the capacitive sensor includes: a first sensing arm and a second sensing arm that extend from the stage in parallel with the axle, the first and second sensing arms being spaced a predetermined distance from the axle in opposite directions; a plurality of driving combs extending from each of the first and second sensing arms in a direction crossing the axle, the driving combs being rotated together with the stage; a plurality of fixed combs arranged in parallel with each other and fixedly supported at a predetermined location for engagement with the driving combs, the fixed combs including surfaces overlapping opposite surfaces of the driving combs in accordance with the rotation of the driving combs; and a capacitance sensing portion which detects a capacitance change of the driving combs and the fixed combs via the overlapping surfaces of the driving combs and the fixed combs.

When the stage is in a horizontal position, the fixed combs and the driving combs may face each other at the same height and overlap each other to a maximum level, and when the stage and the driving combs are rotated, an overlapping area between the fixed combs and the driving combs may decrease.

When the stage is in a horizontal position, the fixed combs and the driving combs may be located at different heights, and when the stage and the driving combs are rotated, the driving combs of the first sensing arm or the second sensing arm may overlap corresponding fixed combs according to a rotational direction of the stage and the driving combs.

When the stage is in a horizontal position, the driving combs of the first sensing arm may be located at a different height from the fixed combs corresponding to the driving combs of the first sensing arm, and the driving combs of the second sensing arm may be located at the same height as the fixed combs corresponding to the driving combs of the second sensing arm.

According to a further another aspect of the present invention, there is provided an MEMS device including: a stage which operates in a vibration mode; a driving body rotatably disposed to upwardly or downwardly face the stage; a spacer column disposed between the stage and the driving body to keep the stage and the driving body at a predetermined distance from each other; a driving coil wound along an edge of the driving body; and a magnet which forms a magnetic field across the driving coil.

According to a still further another aspect of the present invention, there is provided an MEMS device including: a stage which operates in a vibration mode; deformation absorbing springs extending outward from both sides of the stage and having a thin ring shape; a driving body rotatably disposed to upwardly or downwardly face the stage; spacer columns disposed between the driving body and the deformation absorbing springs so as to keep the driving body and the deformation absorbing springs at a predetermined distance from each other in a vertical direction; a driving coil wound along an edge of the driving body; and a magnet which forms a magnetic field across the driving coil.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS

An MEMS device will now be described more fully with reference to the accompanying drawings, in which exemplary embodiments of the invention are shown.

Figure 1:
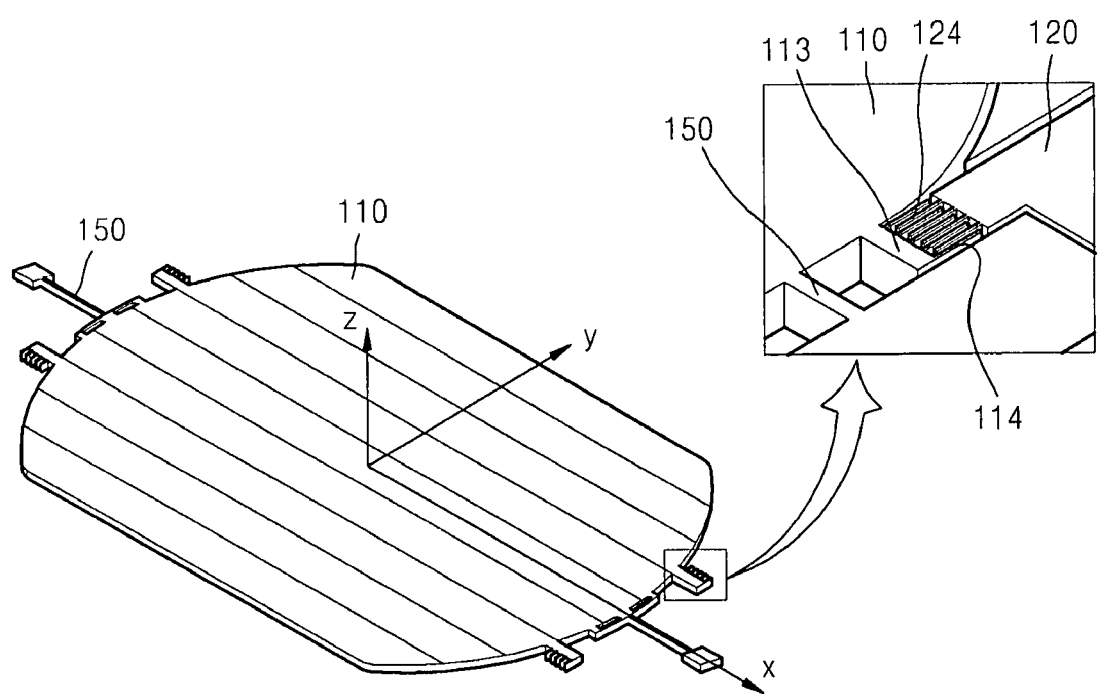
FIG. 1 is a perspective view illustrating main parts of an MEMS device according to an exemplary embodiment of the present invention.

FIG. 1 is a perspective view illustrating main parts of an MEMS device according to an exemplary embodiment of the present invention. The MEMS device includes a stage 110 operating in vibration mode, an axle 150 supporting the stage 110 and functioning as a rotating center of the stage 110, and an outer frame 120 (illustrated only in the enlarged view of FIG. 1 for clarity) surrounding the stage 110. The MEMS device further includes a capacitive sensor detecting the rotation of the stage 110.

The capacitive sensor includes a sensing arm 113 extending from an end of the stage 110 at a predetermined distance from the axle 150 in parallel with the axle 150 (in an x-axis direction), a plurality of driving combs 114 evenly extending from the sensing arm 113 in an y-axis direction perpendicular to the axle 150, and a plurality of fixed combs 124 extending in parallel from the outer frame 120 for interlocking with the driving combs 114. The driving combs 114 are rotated together with the stage 110 about the axle 110. As the driving combs 114 rotate, the driving combs 114 approaches or departs from the fixed combs 124 in a z-axis direction according to the rotation direction of the driving combs 114.

Figure 2:
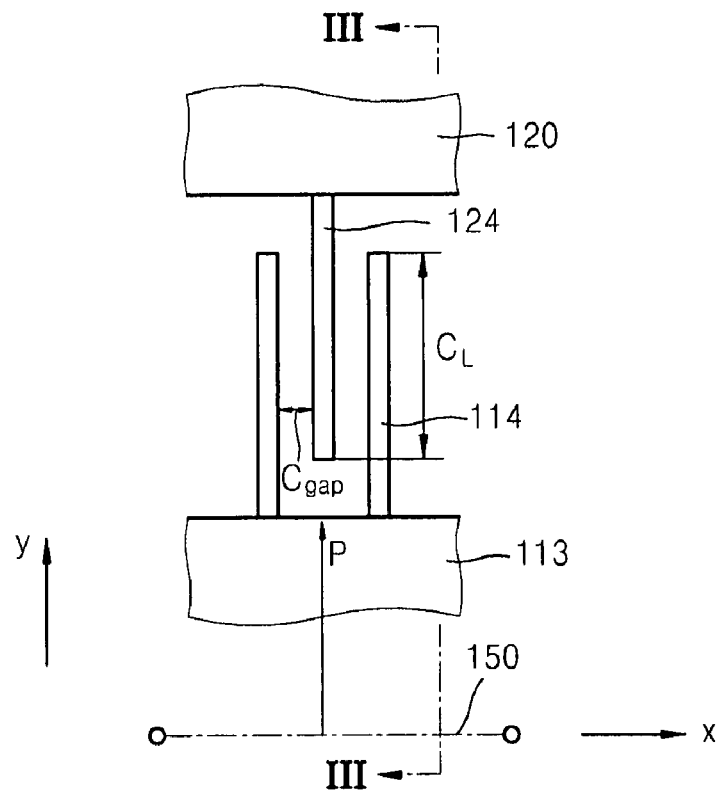
FIG. 2 is an enlarged plan view illustrating a capacitive sensor of the MEMS device of FIG. 1 according to an exemplary embodiment of the present invention.

FIG. 2 is an enlarged plan view illustrating the capacitive sensor of the MEMS device of FIG. 1 according to an exemplary embodiment of the present invention. Referring to FIG. 2, the fixed combs 124 and the driving combs 114 are spaced a predetermined gap $C_{gap}$ in the x-axis direction and have an overlapping length $C_L$ in the y-axis direction. When a predetermined electrical potential difference is applied between the fixed combs 124 and the driving combs 114, the overlapping fixed combs 124 and the driving combs 114 are electrically charged. Reference numeral P denotes the distance between the axle 150 and an end of the sensing arm 113.

Figure 3:
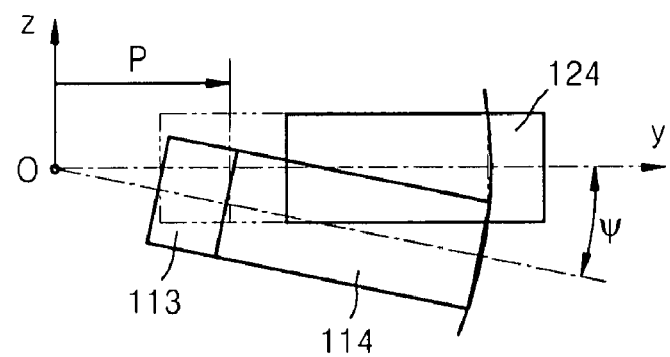
FIG. 3 is a sectional view taken along line III-III of FIG. 2 to illustrate a vertical arrangement of the capacitive sensor according to an exemplary embodiment of the present invention.

FIG. 3 is a sectional view taken along line III-III of FIG. 2. Referring to FIG. 3, an overlapping area between the mutually-facing fixed combs 124 and the driving combs 114 increases or decreases as the driving combs 114 rotate. When the stage 110 is in a horizontal position, the driving combs 114 supported by the stage 110 are placed in parallel with the fixed combs 124 and thus overlap the fixed combs 124 maximally. Therefore, the overlapping area between the driving combs 114 and the fixed combs 124 is maximal, and thus the capacitance of the driving combs 114 and the fixed combs 124 is also maximal. When the stage 110 rotates a predetermined angle, the driving combs 114 incline with respect to the fixed combs 124 and thus overlap the fixed combs 124 less compared with the case where the stage 110 is in the horizontal position. That is, the overlapping area of the combs 114 and 124 and the capacitance of the combs 114 and 124 dependent on the overlapping area can be expressed as a function of a rotation angle $\Psi$ of the stage 110.

Figure 4:
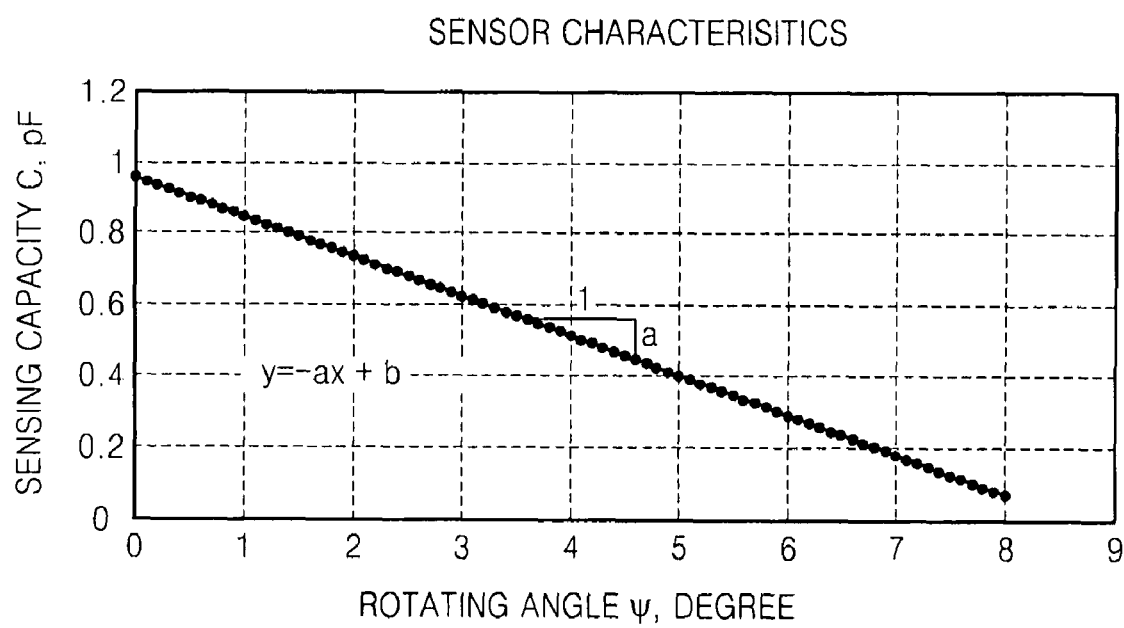
FIG. 4 is a graph showing a linear relationship between the capacitance of the capacitive sensor and the rotation angle of a stage, according to an exemplary embodiment of the present invention.
Figure 5:
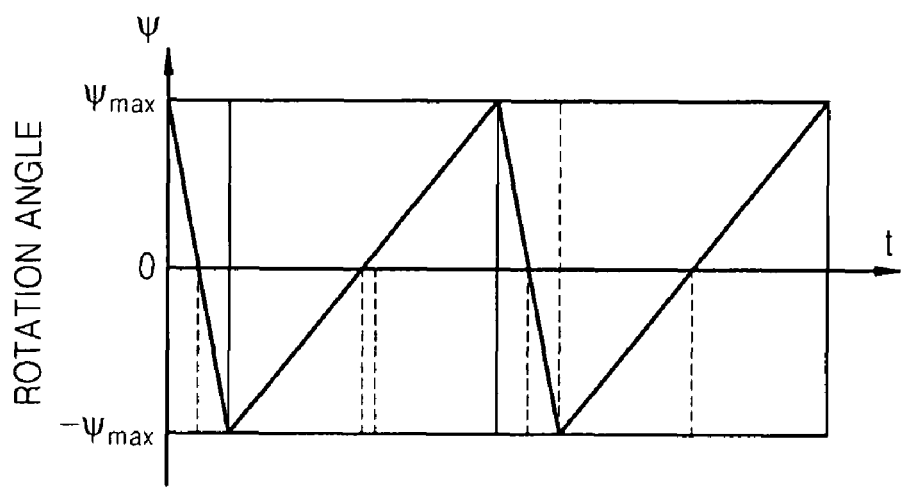
FIG. 5 is a profile graph showing the rotation angle of the stage as a function of driving time, according to an exemplary embodiment of the present invention.

FIG. 4 is a graph showing a relationship between the capacitance (C) of the combs 114 and 124 and the rotation angle $\Psi$ of the stage 110. When the rotation angle $\Psi$ of the stage 110 increases from zero degree, the capacitance (C) of the combs 114 and 124 decreases in linear proportion to the increase of the rotation angle $\Psi$. This linear relationship between the capacitance (C) and the rotation angle $\Psi$ can be expressed by "y=−ax+b", where (a) denotes a proportional constant determined by system variables of the capacitance sensor. The proportional constant (a) relates to the sensitivity or resolving power of the capacitive sensor. When the capacitive sensor has a great proportional constant (a), the capacitive sensor can perform precise sensing with a great sensitivity. FIG. 5 is a graph showing the rotation angle $\Psi$ of the stage 110 with respect to driving time (t). The rotation angle $\Psi$ of the stage 110 periodically changes with different rising and falling intervals in a given period. The rotation angle $\Psi$ of the stage 110 periodically changes between $+\Psi_{max}$ and $-\Psi_{max}$ based on the horizontal position of the stage 110 ($\Psi=0°$ when the stage 110 is in a horizontal position).

Figure 6:
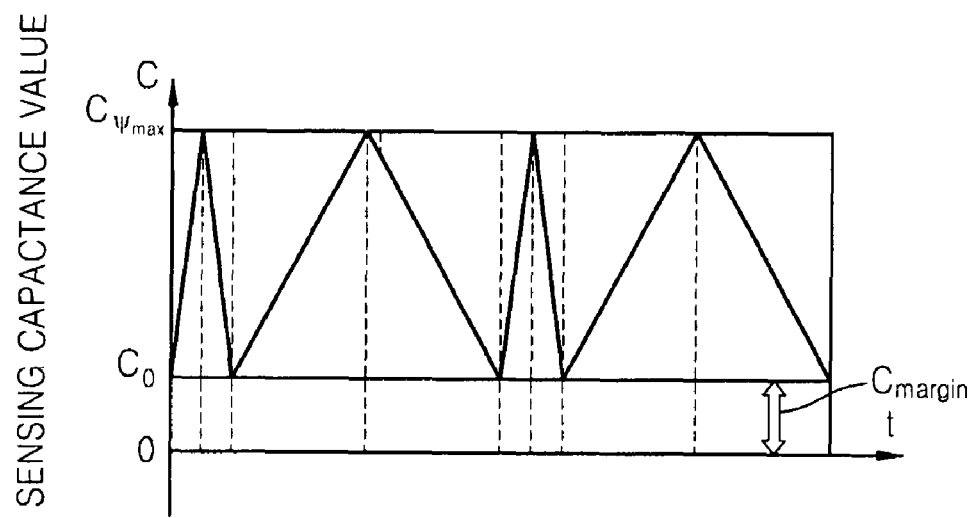
FIG. 6 is a capacitance-time graph of the capacitive sensor when the stage is driven as illustrated in FIG. 5, according to an exemplary embodiment of the present invention.

FIG. 6 is a capacitance-time graph of the combs 114 and 124 when the stage 110 is driven as illustrated in FIG. 5. Referring to FIG. 6, when the rotation angle $\Psi$ of the stage 110 is zero (when the stage is in a horizontal position), the capacitance (C) of the combs 114 and 124 is at a maximum $C_{\Psi_{max}}$. When the rotation angle $\Psi$ of the stage 110 is at a maximum $+\Psi_{max}$ or minimum $-\Psi_{min}$, the capacitance (C) of the combs 114 and 124 is at a minimum $C_0$. A driving margin $C_{margin}$ corresponding to the minimum capacitance $C_0$ may be maintained at a sufficiently large value for the linear relationship between the rotation angle $\Psi$ and the capacitance (C). Meanwhile, the capacitive sensor further includes a detecting circuit (not shown) to electrically measure the capacitance (C) of the combs 114 and 124. The detecting circuit can be configured in a conventional manner, and thus a detailed description of the detecting circuit will be omitted.

Figure 7:
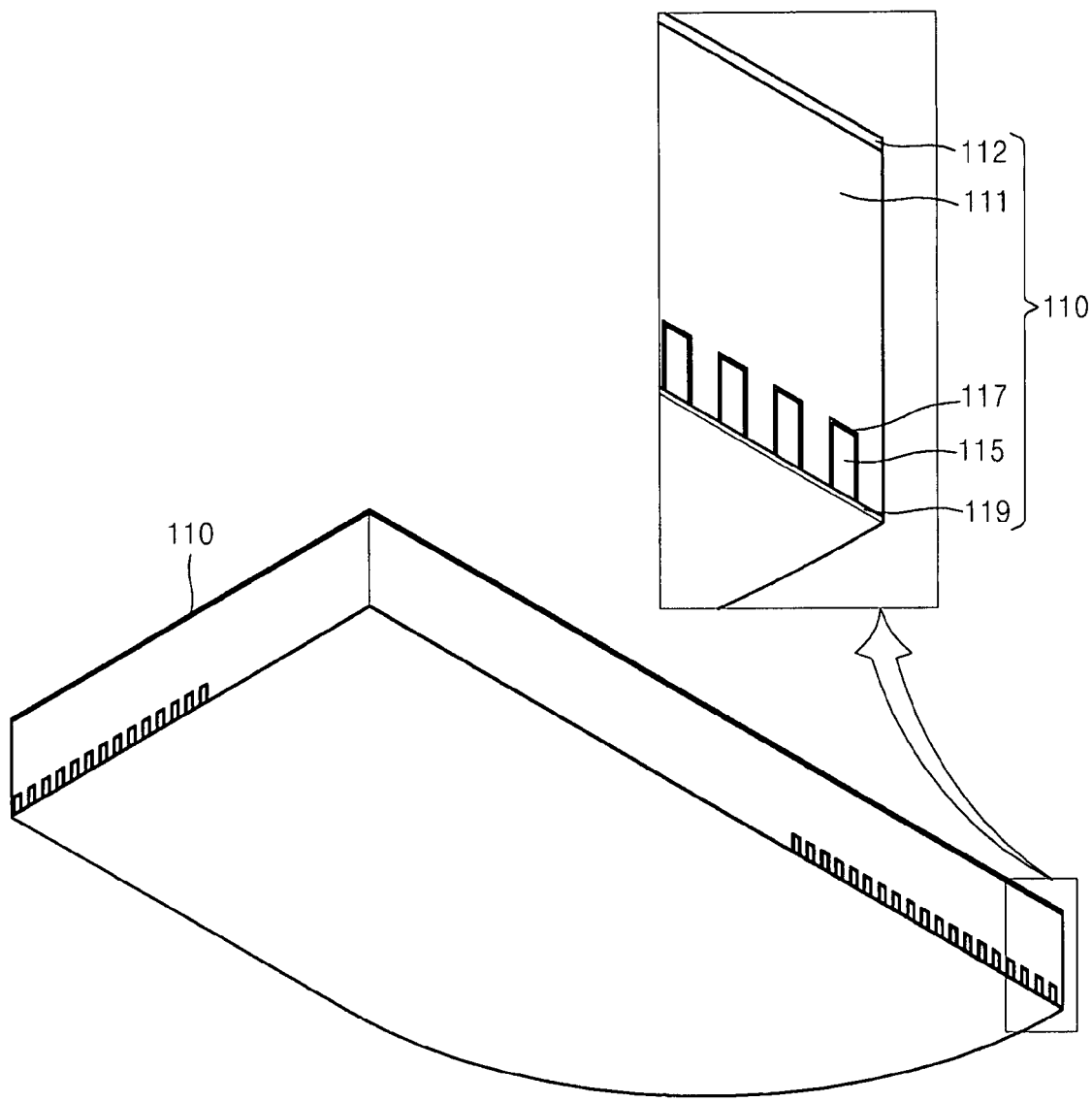
FIG. 7 illustrates a vertical sectional structure of the stage according to an exemplary embodiment of the present invention.

FIG. 7 illustrates a vertical sectional structure of the stage 110 depicted in FIG. 1. Referring to FIG. 7, the stage 110 includes a silicon layer 111 forming a body of the stage 110, a driving coil pattern 115 filled in trenches formed in a bottom surface of the silicon layer 111, a coil insulating layer 117 formed between the silicon layer 111 and the driving coil pattern 115 to surround the driving coil pattern 115, an insulating layer 119 covering the bottom surface of the silicon layer 111 and exposed surfaces of the driving coil pattern 115 to insulate the silicon layer 111 and the driving coil pattern 115, and a reflective metal layer 112 formed on top of the stage 110. The insulating layer 119 forming a bottom portion of the stage 110 may be formed of an insulating material having a low thermal expansion coefficient. For example, the insulating layer 119 may be formed of a silicon oxide, like the coil insulating layer 117. The reflective metal layer 112 forming a top portion of the stage 110 may be formed of a metal having a high thermal expansion coefficient and reflectivity, so as to be used as a bimetal together with the insulating layer 119. For example, the reflective metal layer 112 may be formed of aluminum.

Figure 8A:
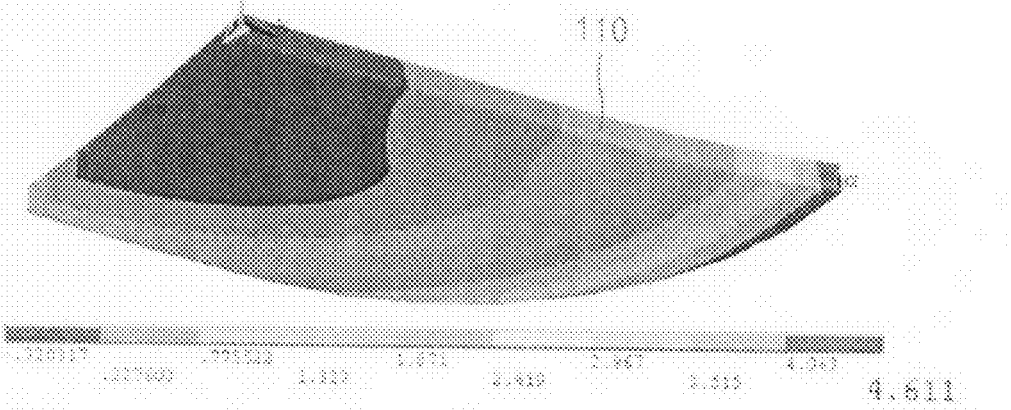
FIGS. 8A and 8B show results of a thermal deformation analysis performed on the stage of FIG. 7, according to an exemplary embodiment of the present invention.
Figure 8B:
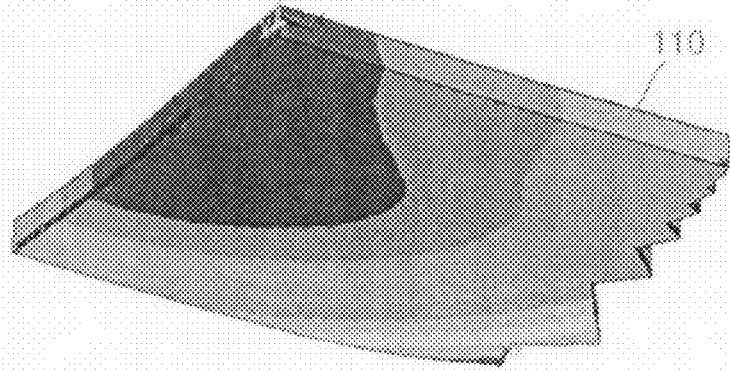

Magnets (not shown) form a magnetic field across the driving coil pattern 115. Therefore, when a driving current is applied to the driving coil pattern 115, an electric field is formed around the coil pattern 115 and interacts with the magnetic field, thereby rotating the stage 110 in a direction determined by the Lorentz law. Here, when the driving current is applied, the driving coil pattern 115 experiences thermal expansion due to its resistance. In this case, since the driving coil pattern 115 is formed on the bottom of the stage 110, the stage 110 can deflect upward. To prevent the upward deflection of the stage 110, the reflective metal layer 112 having a high thermal expansion coefficient is formed on top of the stage 110, and the insulating layer 119 having a low thermal expansion coefficient is formed on the bottom of the stage 110. That is, the upper reflective metal layer 112 and the lower insulating layer 119 function as a bimetal deflecting the stage 110 downward, so that the upward deflection of the stage 110 by the driving coil pattern 115 can be prevented. Therefore, the reflective metal layer 112 of the stage 110 can be kept flat, and thus a scanning line distortion can be prevented. FIGS. 8A and 8B show results of a thermal deformation analysis performed on the stage 110 for explaining the effects of the exemplary embodiment of the present invention. Referring to FIG. 8A, the deflection of the stage 110 in the z-axis direction is indicated. Due to this deflection (bending deformation), an end of the stage 110 was deflected by 4.611 μm in the z-axis direction when compared with a center of the stage 110. Referring to FIG. 8B, in the effective area of the stage 110 actually used for reflecting light, the maximum deflection of the stage 110 was 3.052 μm.

Figure 9:
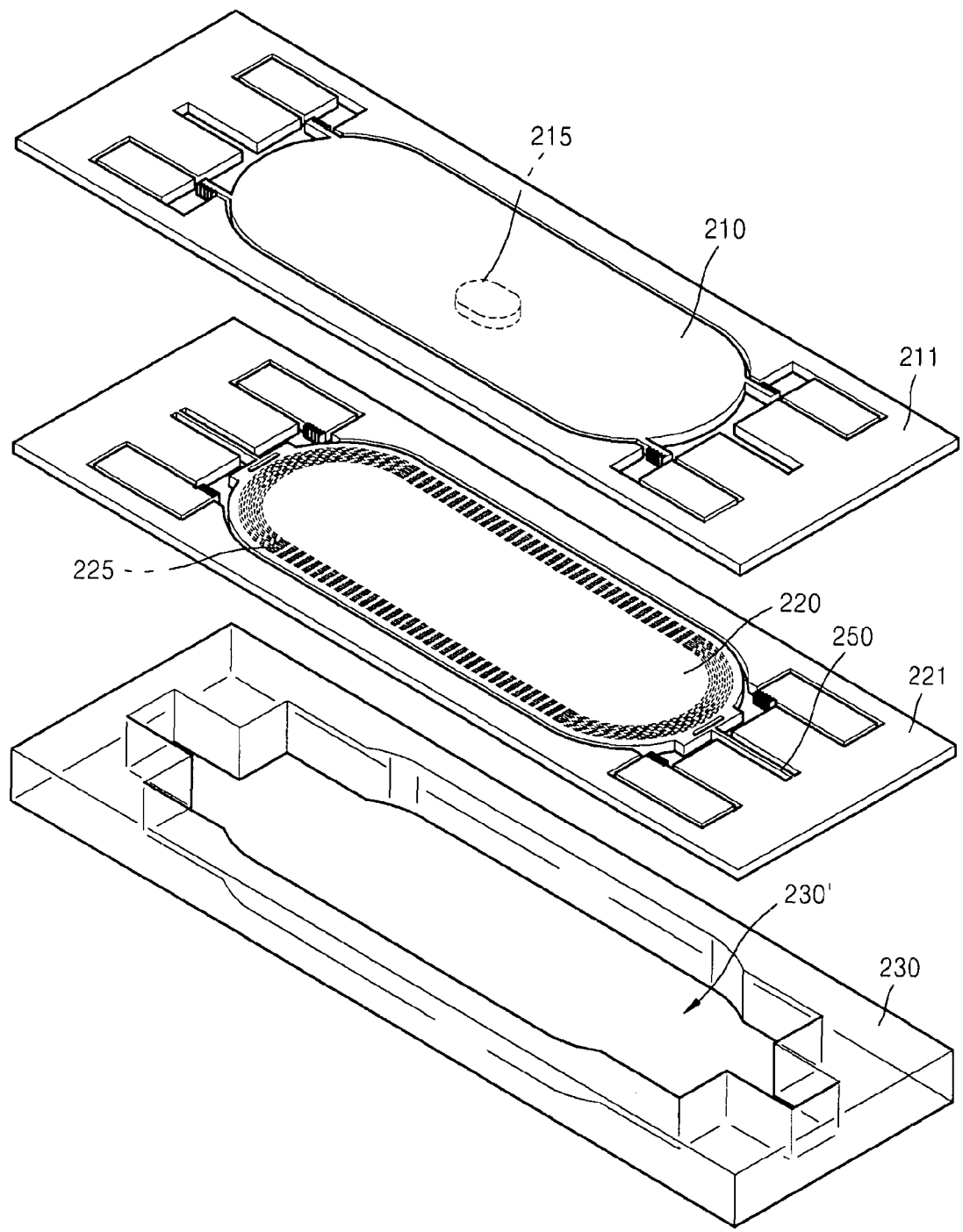
FIG. 9 is an exploded perspective view illustrating an MEMS device according to another exemplary embodiment of the present invention.

FIG. 9 is an exploded perspective view illustrating an MEMS device according to another exemplary embodiment of the present invention. Referring to FIG. 9, the MEMS device includes a stage 210 and a driving body 220 that face each other, an axle 250 supporting the driving body 220 and functioning as a rotating center of the driving body 220, an outer frame 221 supporting the driving body 220 via the axle 250 and allowing rotation of the driving body 220, and a frame base 230 receiving and supporting the outer frame 221.

The stage 210 and the driving body 220 may have shapes similar to each other and be arranged vertically. When the MEMS device is used as an optical scanner in a display apparatus, the stage 210 includes a reflecting surface on one side. The driving body 220 supports the stage 210 and operates the stage 210 in a vibration mode. While operating in the vibration mode, the stage 210 deflects incident light in a scanning direction. It is not necessary that the stage 210 have the same area as the driving body 220. The stage 210 can have a smaller area than the driving body 220 as long as the stage 210 can have a sufficient light reflecting area for satisfying a given scanning angle.

A driving coil 225 is wound along the edge of the driving body 220. The driving coil 225 runs along a curve at rounded portions of the edge of the driving body 220. A driving current is applied from an outer power source (not shown) to an end of the driving coil 225. Magnets (not shown) generate a magnetic field across the driving coil 225, and interaction between the applied driving current and the magnetic field causes the driving body 220 to rotate about the axle 250 in a direction determined by the Lorentz law. In the current exemplary embodiment, the driving body 220 is provided separate from the stage 210, and the driving coil 225 is wound around the driving body 220. In other words, since the driving coil 225 is formed under the stage 210, thermal deformation of the stage 210 by the driving coil 225 can be prevented. Therefore, the driving coil 225 can be wound around a relatively small diameter, thereby reducing the moment of inertia of rotary parts such as the driving body 220 and improving the driving efficiency of the MEMS device.

Meanwhile, in addition to the outer frame 221, another outer frame 211 is provided around the stage 210 at a predetermined distance from the stage 210. The outer frames 211 and 221 have shapes similar to each other and are arranged vertically. The outer frame 221 surrounding the driving body 220 supports the driving body 220 via the axle 250 and allows the rotation of the driving body 220, and a connection terminal (not shown) is formed on the outer frame 221 in electrical connection with the driving coil 225 so as to supply electricity to the driving coil 225 from an outside power source. The outer frame 221 is stably supported by the frame base 230. The frame base 230 supports the driving body 220 and spaces the driving body 220 a predetermined distance from a floor, thereby allowing a vibration motion of the driving body 220. An opening 230' is formed in a center portion of the frame base 230, such that the driving body 220 can vibrate without interference.

Figure 10A:
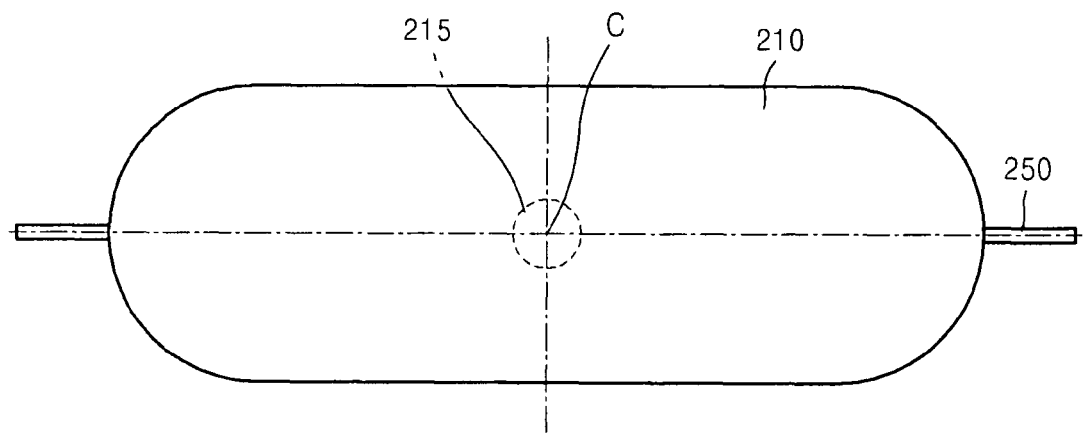
FIGS. 10A and 10B are views illustrating a coupling structure of the stage and the driving body of FIG. 9, according to an exemplary embodiment of the present invention.
Figure 10B:
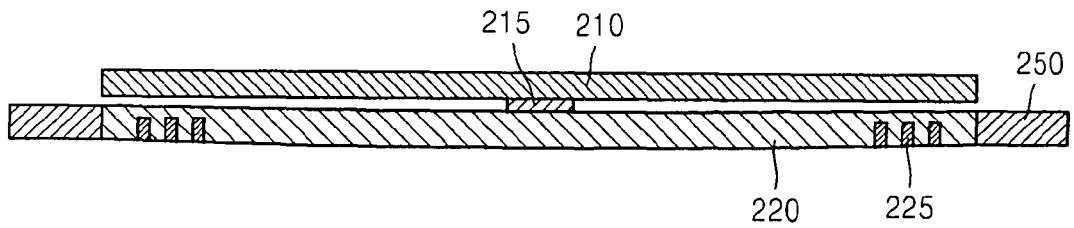

FIG. 10A shows planar and sectional structures of the stage 210 supported by the driving body 220. Referring to FIG. 10A, a spacer column 215 is interposed between the stage 210 and the driving body 220. The spacer column 215 keeps the stage 210 and the driving body 220 at a predetermined distance from each other so as to prevent transmission of bending deformation of the driving body 220 to the stage 210. In detail, the driving coil 225 undergoes thermal expansion due to its resistance when a current is applied, and thus the driving body 220 in which the driving coil 225 is formed can be deflected upward as shown in FIG. 10B. However, since the stage 210 is spaced apart from the driving body 220, the stage 210 can be kept flat. That is, the driving body 220 can be freely deflected without interference with the stage 210 owing to the gap formed by the spacer column 215 between the stage 210 and the driving body 220. The stage 210 can be thermally or mechanically affected by the spacer column 215. Therefore, a contact area between the stage 210 and the spacer column 215 is maintained minimal as long as the stage 210 can be stably supported.

Figure 11A:
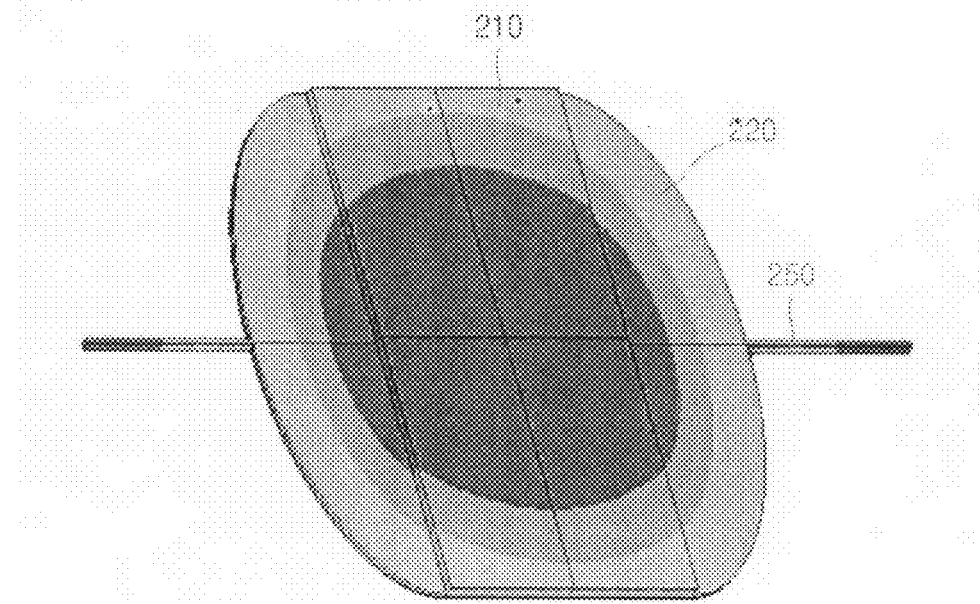
FIGS. 11A and 11B show bending deformation analysis results to compare a conventional stage and driving body with the stage and driving body of the present invention, according to an exemplary embodiment of the present invention.
Figure 11B:
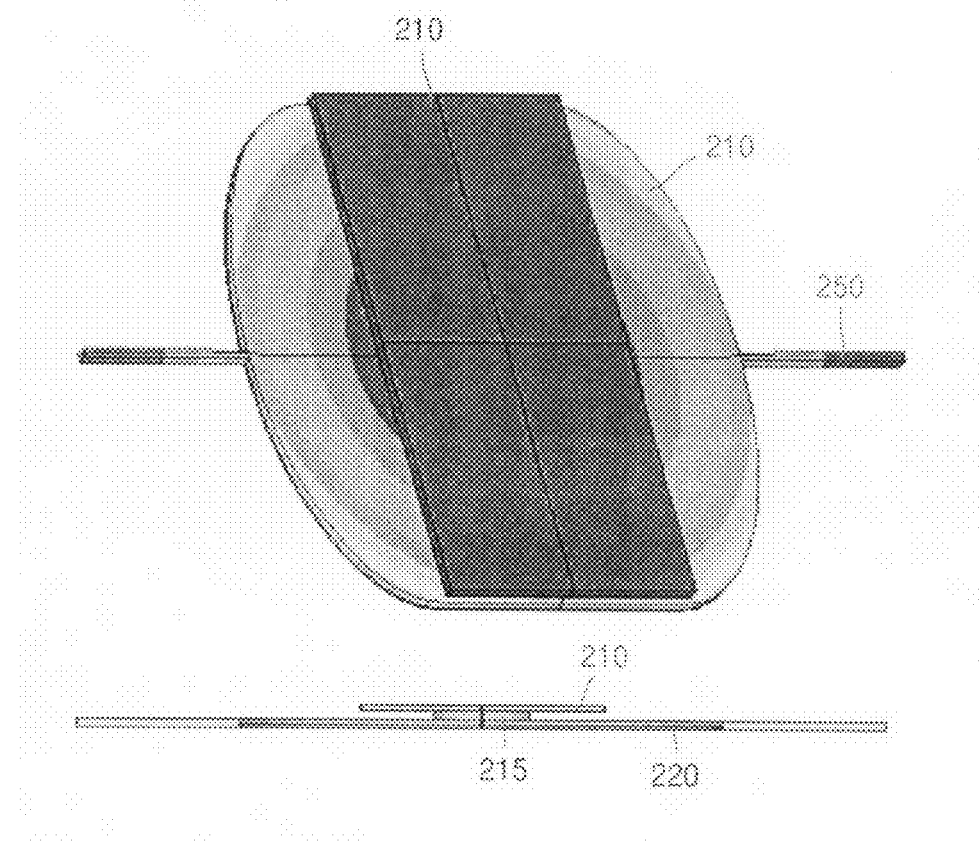

FIGS. 11A and 11B show bending deformation analysis results to compare a related art case where the entire bottom surface of the stage 210 is supported, with the case where a portion of the bottom surface of the stage 210 is supported by the spacer column 215 and the other portion of the bottom surface is let free in the current exemplary embodiment of the present invention. In FIGS. 11A and 11B, like reference numerals denote like elements. Referring to FIG. 11A showing the analysis result of the related art structure, a deformation of the driving body 220 was directly transmitted to the stage 210, causing the maximum vertical deformation of the stage 210 to be 6.57 μm. However, referring to FIG. 11B showing the analysis result of the present invention, under the same conditions, the maximum vertical deformation of the stage 210 was 0.45 μm (about 1/10 of the maximum value measured in a related case). Therefore, the analytical results show that the MEMS device according to the current exemplary embodiment of the present invention is more suitable for precise optical scanning.

Figure 12A:
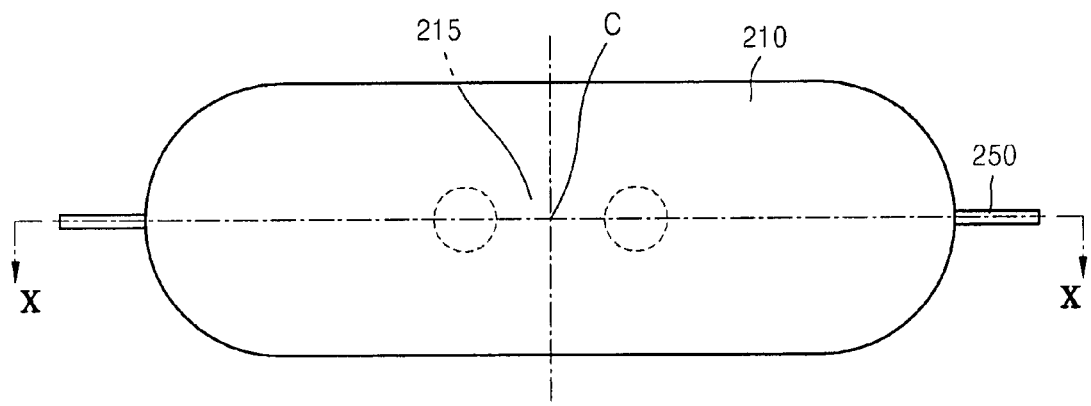
FIGS. 12A and 12B show modification examples of FIG. 10A, according to another exemplary embodiments of the present invention.
Figure 12A:
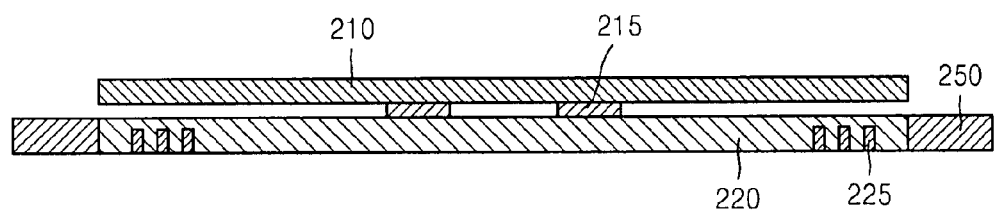
Figure 12B:
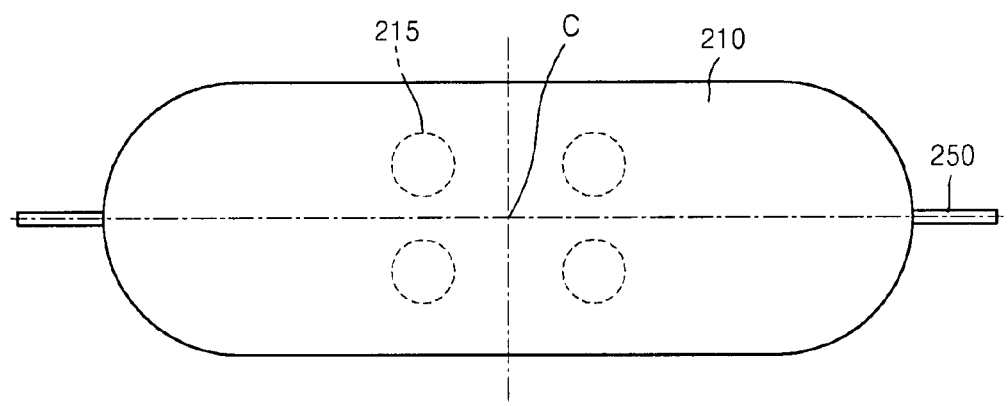
Figure 12B:
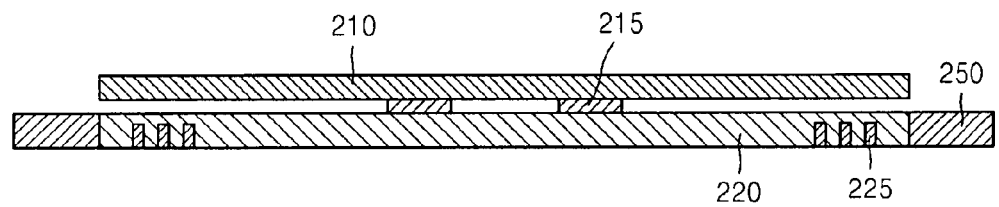

In the current exemplary embodiment, one spacer column 215 is provided on a center (C) of the stage 210 to stably support the stage 210. However, referring to FIGS. 12A and 12B, two or more spacer columns 215 can be provided in a predetermined arrangement. In this case, even when the spacer columns 215 are not precisely aligned, the stage 210 can be stably supported by the spacer columns 215. The center of the arranged spacer columns 215 may be aligned with the center (C) (particularly, the center of gravity) of the stage 210. For this, the spacer columns 215 can be symmetrically arranged with respect to the center of the stage 210.

Figure 13A:
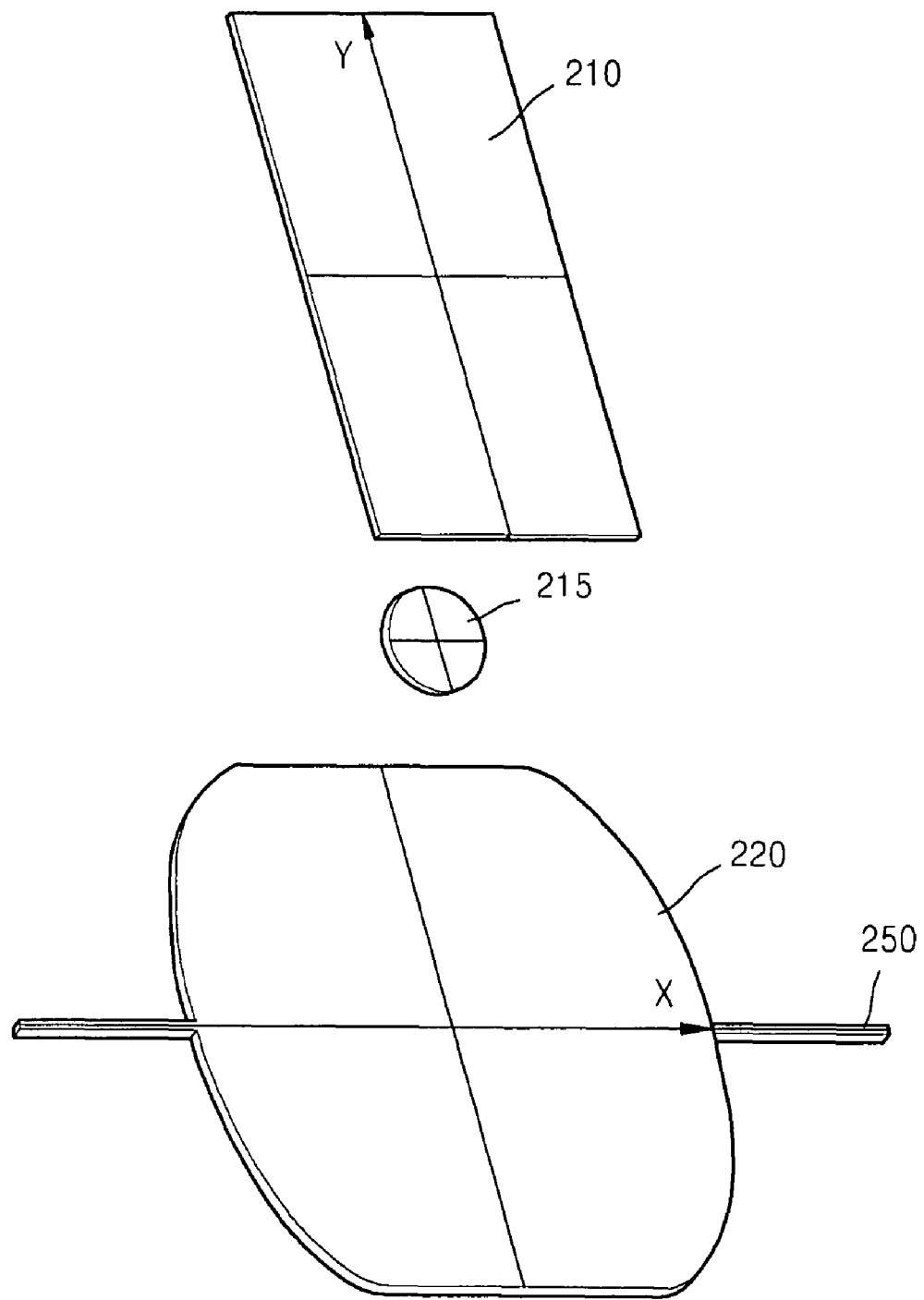
FIGS. 13A and 13B show different structures that can be employed for effectively maintaining the flatness of the stage according to exemplary embodiments of the present invention.
Figure 13B:
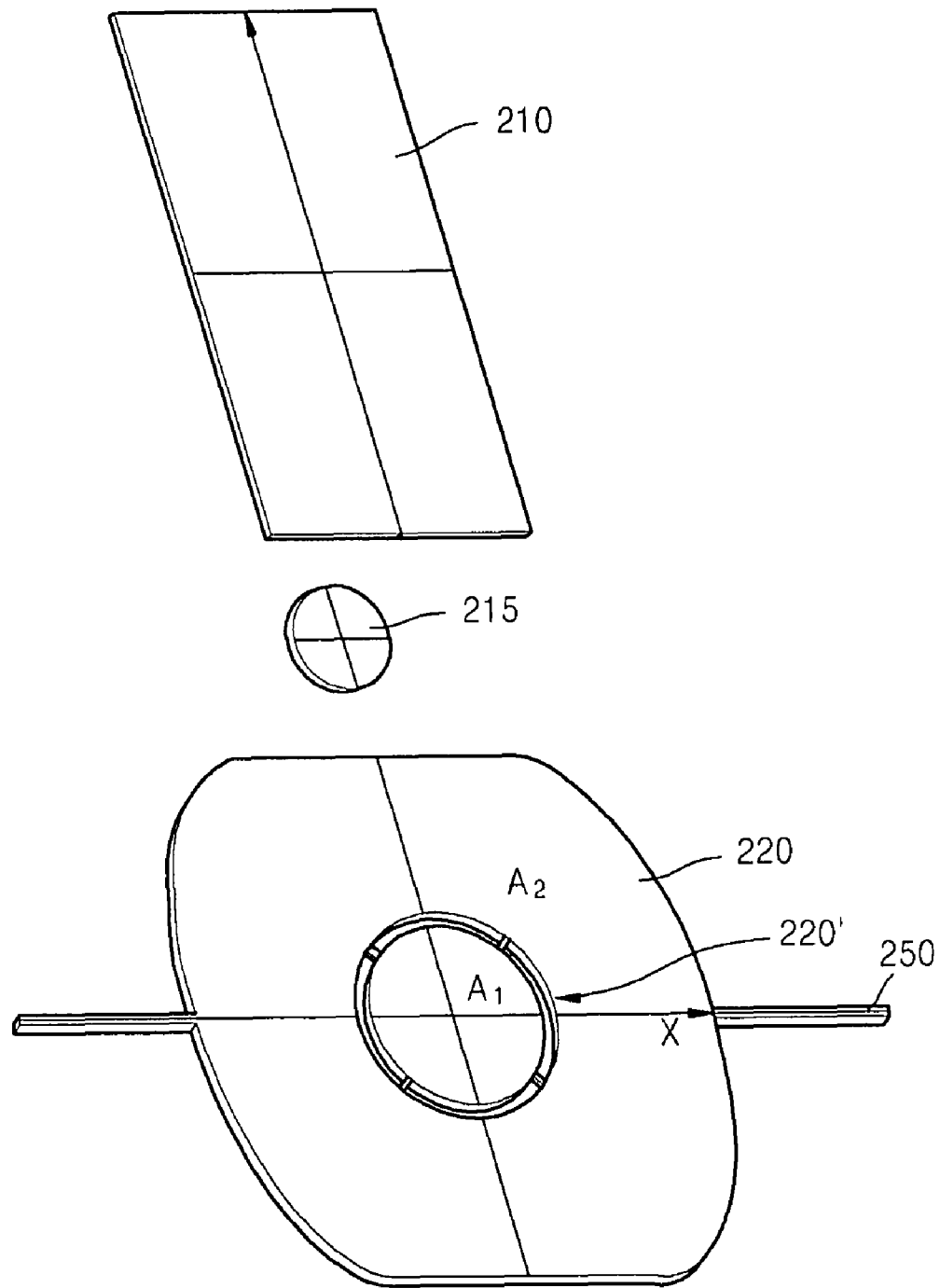

In the current exemplary embodiment, the stage 210 having a reflecting surface is disposed above the driving body 220 providing a driving force, and the spacer column 215 is interposed between the stage 210 and the driving body 220 to keep the stage 210 and the driving body 220 at a predetermined distance from each other. FIGS. 13A and 13B show different structures that can be employed for effectively maintaining the flatness of the stage 210. In FIGS. 13A and 13B, like reference numerals denote like elements. Referring to FIGS. 13A and 13B, the stage 210 and the driving body 220 face each other and are spaced a predetermined distance apart from each other. The stage 210 includes a light reflecting surface smaller than the driving body 220. Referring to FIG. 13A, the driving body 220 has a plate shape. However, referring to FIG. 13B, the driving body 220 includes a circular opening 220' and is divided into a center region A1 and an outer region A2 by the circular opening 220'. The circular opening 220' prevents thermal deformation from being transmitted between the center region A1 and the outer region A2.

Figure 14:
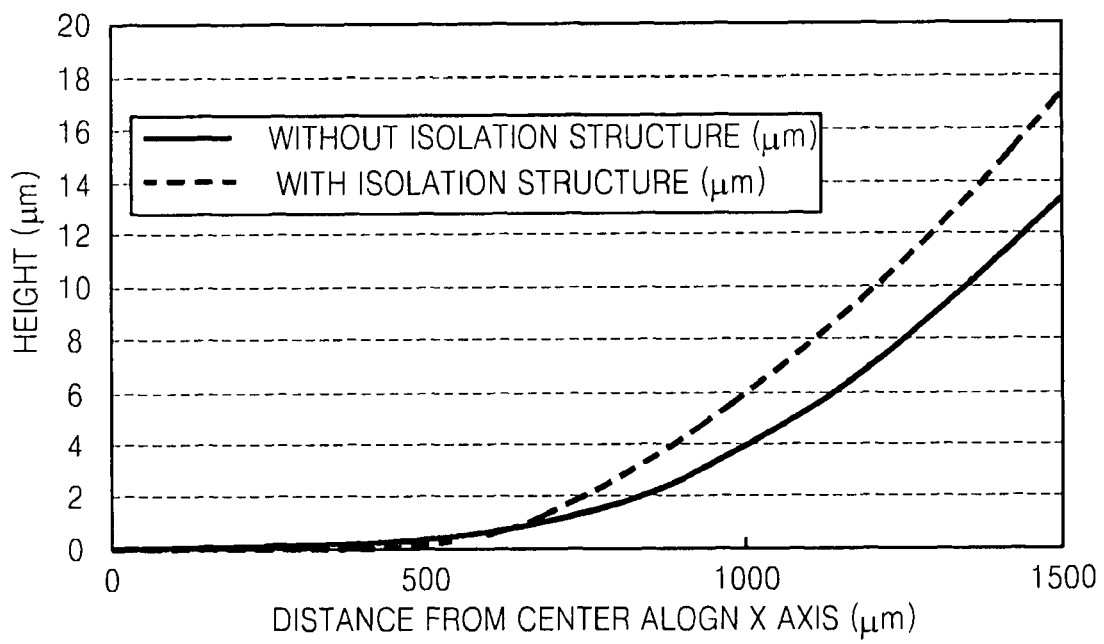
FIG. 14 shows bending deformation analysis results for the driving bodies of FIGS. 13A and 13B, according to an exemplary embodiment of the present invention.

FIG. 14 shows bending deformation analysis results for the driving bodies 220 of FIGS. 13A and 13B. In FIG. 14, the horizontal axis denotes the distance from the center of the driving body 220 in the x-axis direction, and the vertical axis denotes deflection of the driving body 220 measured in a vertical direction (perpendicular to the x-axis and y-axis directions) when the driving body 220 was heated to 100° C. Referring to FIG. 14, both the driving bodies 220 of FIGS. 13A and 13B were deflected upward. In detail, the driving body 220 of FIG. 13B (indicated by a dashed line) was deflected much more than the driving body 220 of FIG. 13A (indicated by a solid line). The reason for this is that the center region A1 and the outer region A2 of the driving body of FIG. 13B are not firmly supported by each other due to the circular opening 220' formed between the center region A1 and the outer region A2. Therefore, the driving body 220 of FIG. 13B is more easily deflected by thermal stress.

Figure 15:
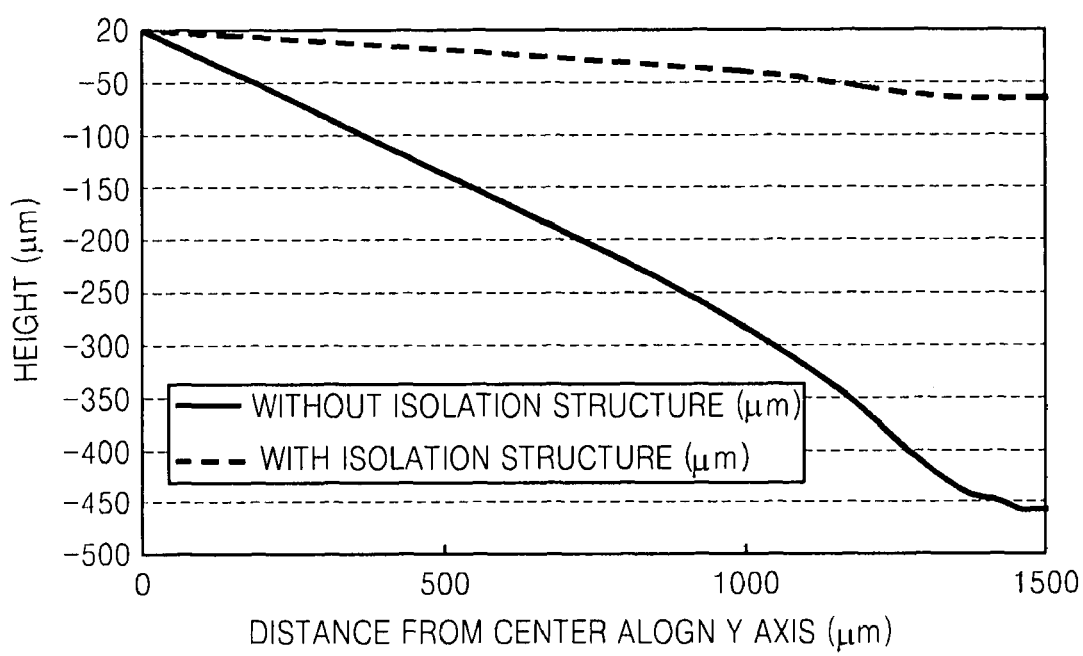
FIG. 15 shows bending deformation analysis results for the stages of FIGS. 13A and 13B, according to an exemplary embodiment of the present invention.

FIG. 15 shows bending deformation analysis results for the stages 210 of FIGS. 13A and 13B. In FIG. 15, the horizontal axis denotes the distance from the center of the stage 210 in the y-axis direction, and the vertical axis denotes deflection of the stage 210 measured in a vertical direction (perpendicular to the x-axis and y-axis directions) when the driving body 220 was heated to 100° C. Referring to FIG. 15, both the stages 210 of FIGS. 13A and 13B were deflected downward. In detail, the maximum deflection of the stage 210 of FIG. 13A (indicated by a solid line) was 450 nm, and the maximum deflection of the stage 210 of FIG. 13B (indicated by a dashed line) was 50 nm. That is, the deflection of the stage 210 can be maintained at a low level of several tens of nanometers (for example, one tenth of incident light wavelength or less) by separating the center region A1 of the driving body 220 using the opening 220'. The reason for this is that since the outer region A2 of the driving body 220 where the driving coil 225 is wound is separated from the center region A1 of driving body 220 where the stage 210 is connected, the propagation of thermal stress from the outer region A2 to the stage 210 is prevented.

Figure 16A:
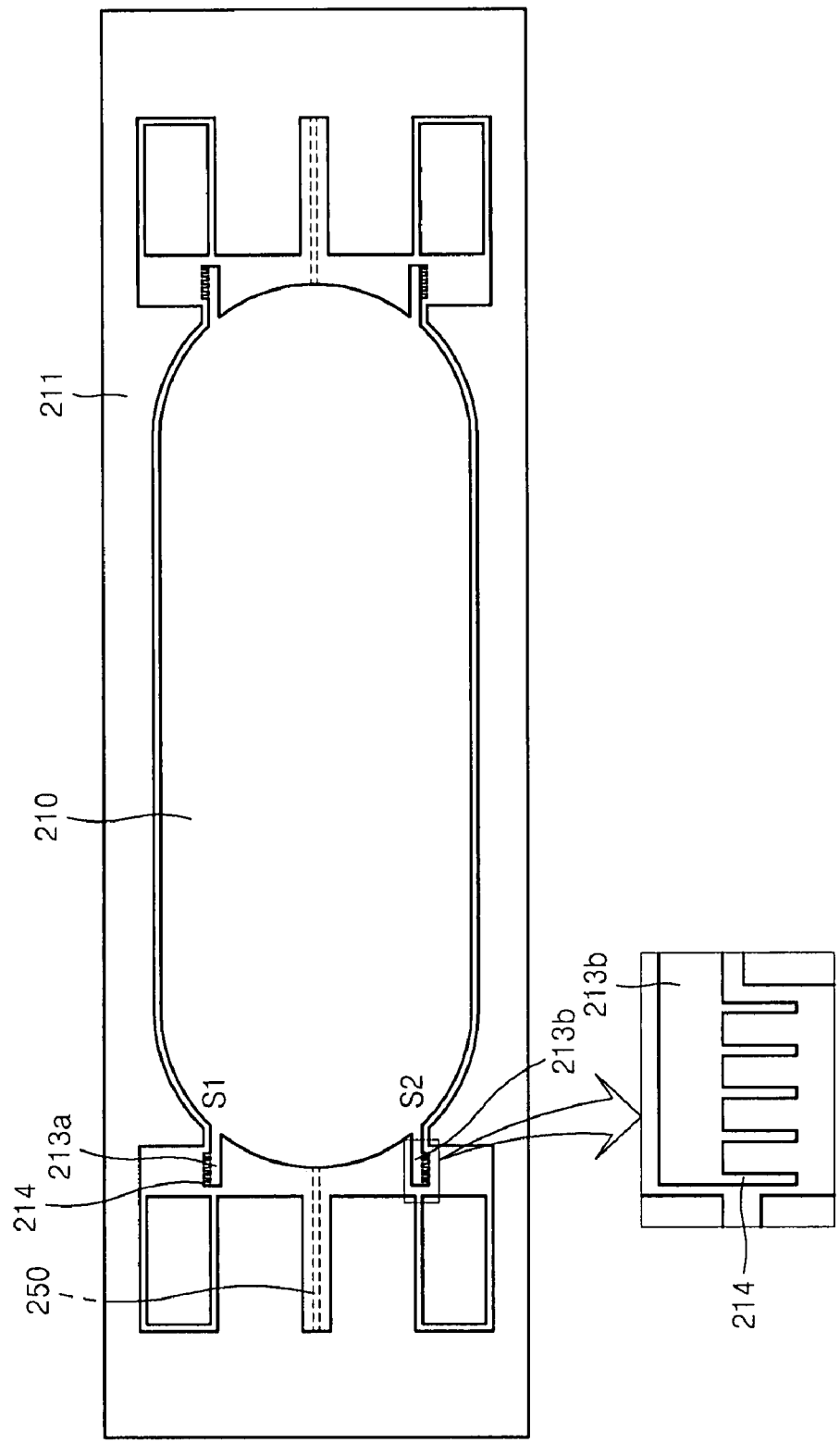
FIGS. 16A and 16B show an upper structure and a lower structure of the MEMS device of FIG. 9 according to exemplary embodiments of the present invention.
Figure 16B:
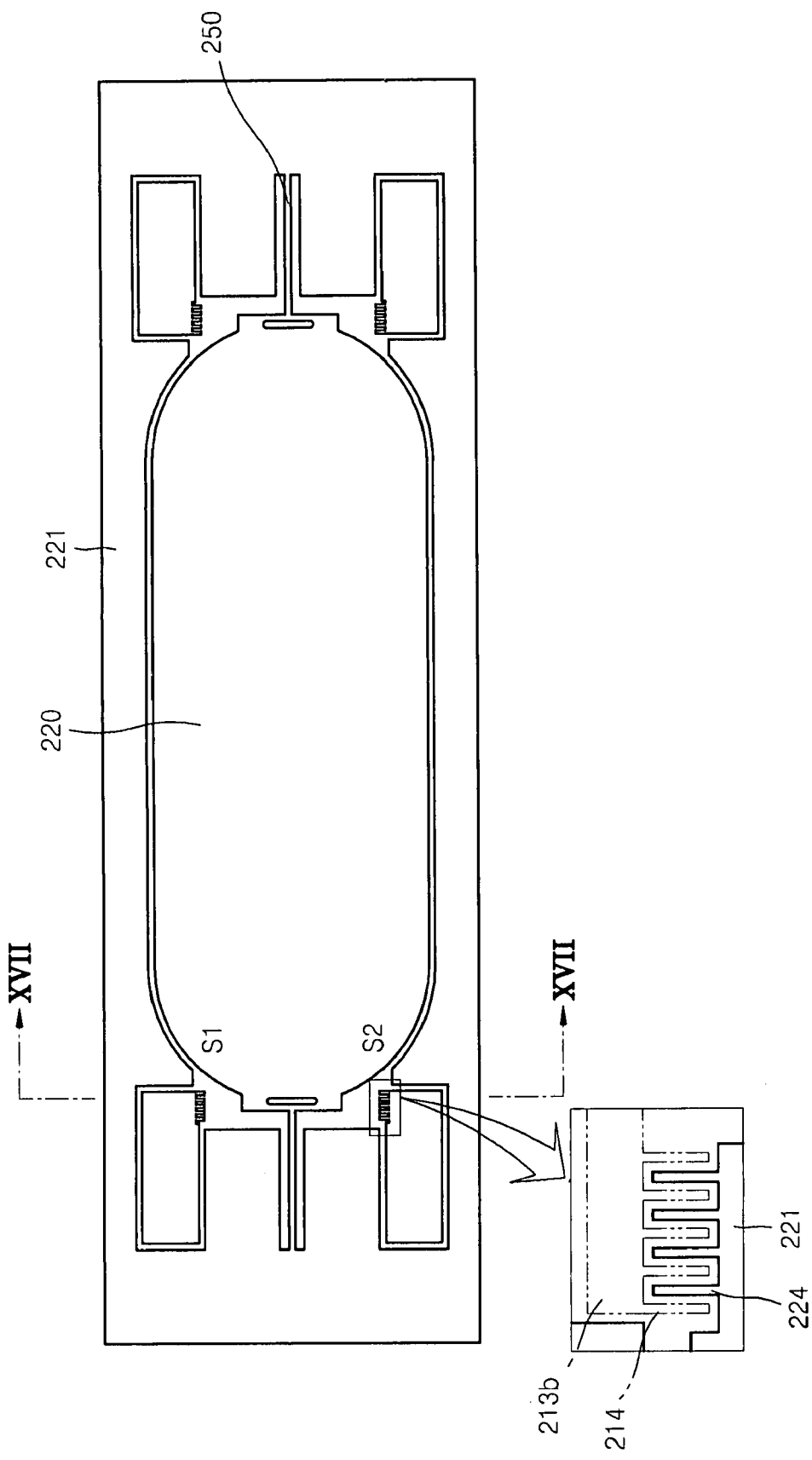

A capacitive sensor can be, provided to monitor the rotation of the stage 210 of the MEMS device according to another exemplary embodiment of the present invention. The capacitive sensor will now be described in detail. FIGS. 16A and 16B show an upper structure of the MEMS device including the stage 210 and the outer frame 211 and a lower structure of the MEMS device including the driving body 220 and the outer frame 221, respectively. Referring to FIG. 16A, sensing arms 213a and 213b extend from the stage 210 in parallel with the axle 250 and are spaced a predetermined distance from the axle 250 in opposite directions. Each of the sensing arms 213a and 213b includes a plurality of driving combs 214 uniformly extending in a direction perpendicular to the axle 250. The driving combs 214 are rotated together with the stage 210 about the axle 250. Referring to FIG. 16B, a plurality of fixed combs 224 is formed at each corner of the outer frame 221. The fixed combs 224 extend in parallel with each other for interlocking with the driving combs 214. The driving combs 214 of the sensing arm 213a and the fixed combs 224 form a first sensing portion S1 at one side of the axle 250, and the driving combs 214 of the other sensing arm 213b and the fixed combs 224 form a second sensing portion S2 at the other side of the axle 250. Referring to enlarged portion of FIG. 16B, the driving combs 214 and the fixed combs 224 are adjacent to each other and are arranged to overlap each other. The capacitance of the driving combs 214 and the fixed combs 224 vary depending on the rotation of the driving combs 214.

Figure 17:
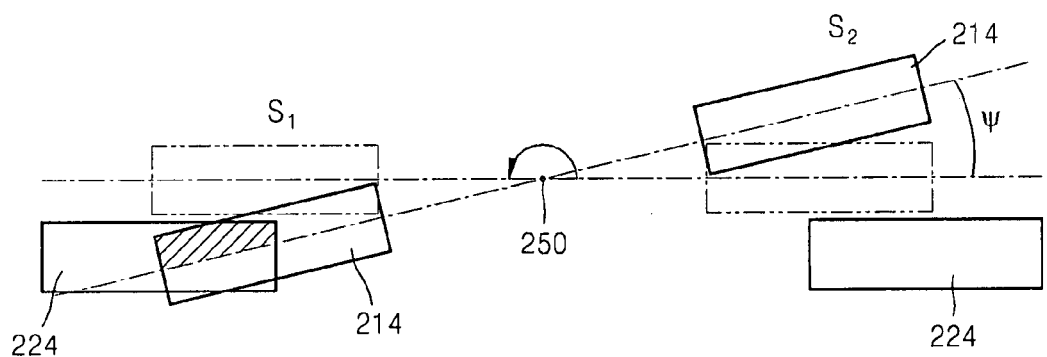
FIG. 17 is a sectional view taken along line XVII-XVII of FIG. 16B to illustrate a vertical arrangement of a capacitive sensor according to an exemplary embodiment of the present invention.

FIG. 17 is a sectional view taken along line XVII-XVII of FIG. 16B. Referring to FIG. 17, the first sensing portion SI and the second sensing portion S2 are respectively formed at the left and right sides of the axle 250. That is, the first sensing portion S1 and the second sensing portion S2 are symmetric with respect to the axle 250. When the stage 210 is in a horizontal position, the driving combs 214 and the fixed combs 224 are placed at different heights and are spaced a small distance from each other. In this state, the combs 214 and 224 are not electrically charged even when a predetermined voltage is applied to the combs 214 and 224. However, when the stage 210 and the driving combs 214 integrally formed with the stage 210 are rotated a predetermined angle Ψ about the axle 250, one of the driving combs 214 overlaps one of the fixed combs 224. In more detail, when the stage 210 is rotated counterclockwise about the axle 250, an overlapping area is formed at the first sensing portion S1 and thus the first sensing portion S1 is electrically charged. However, in this case, the second sensing portion S2 is not electrically charged. Although now shown, when the stage 210 is rotated clockwise about the axle 250, an overlapping area is formed at the second sensing portion S2 and thus the second sensing portion S2 is electrically charged. In this case, the capacitance of the first sensing portion S1 is not electrically charged. The rotation direction of the stage 210 can be easily determined by measuring changes in the capacitances of the first and second sensing portions S1 and S2. Furthermore, the rotation angle of the stage 210 can be easily determined using the measured capacitances of the first and second sensing portions S1 and S2 and the capacitance-rotation angle relationship of FIG. 4.

Alternatively, the first and second sensing portions S1 and S2 can be asymmetric with respect to the axle 250. For example, when the stage 210 is in a horizontal position, the driving combs 214 and the fixed combs 224 of the first sensing portion S1 can be placed at the same height, and the driving combs 214 and fixed combs 224 of the second sensing portion S2 can be placed at different heights.

Figure 18:
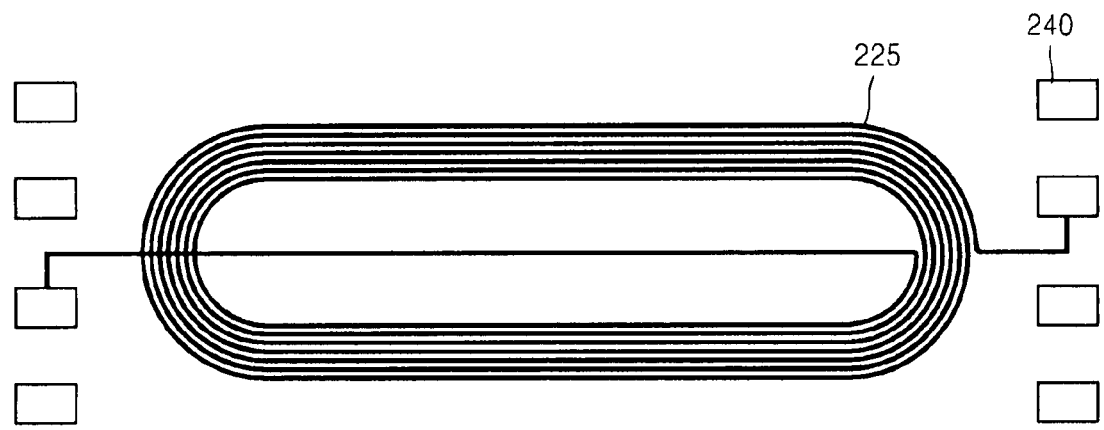
FIG. 18 is a plan view illustrating a driving coil according to an exemplary embodiment of the present invention.
Figure 19A:
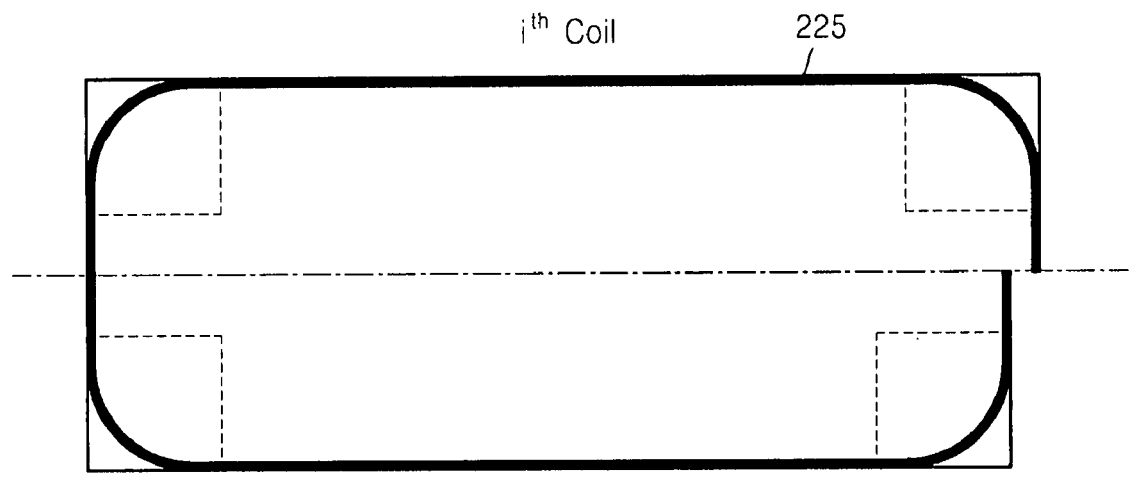
FIGS. 19A and 19B show an $i^{th}$ turn of a driving coil having rounded corners and an $i^{th}$ turn of a driving coil having non-rounded corners, according to an exemplary embodiment of the present invention.
Figure 19B:
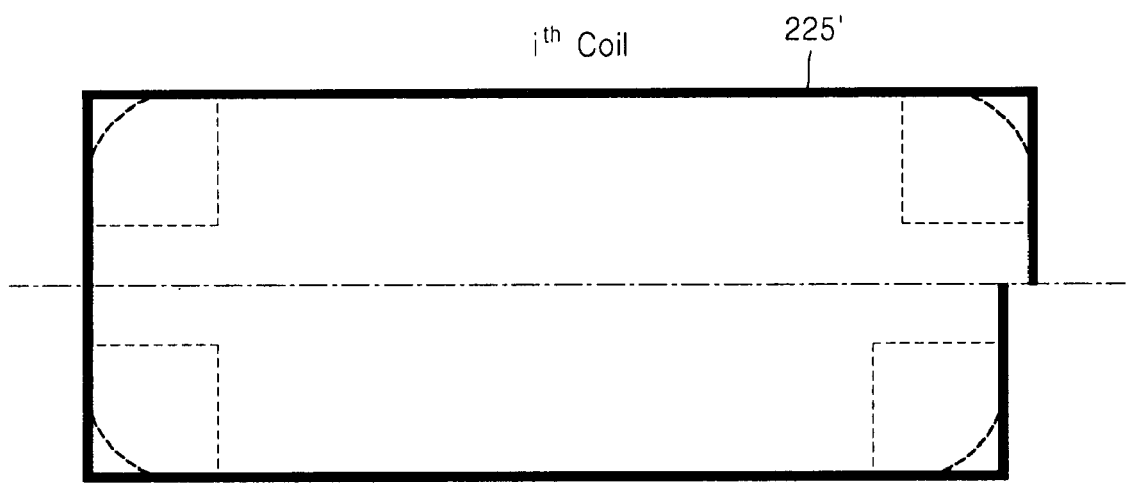

FIG. 18 shows a driving coil pattern of the MEMS device of FIG. 9 according to an exemplary embodiment of the present invention. Referring to FIG. 18, a driving coil 225 is wound to run from an inside area to an outer area. Inner and outer ends of the driving coil 225 are respectively connected to connection terminals 240 to receive a driving current. FIGS. 19A and 19B show an $i^{th}$ turn of a driving coil 225 having rounded corners and an $i^{th}$ turn of a driving coil 225' having non-rounded corners. Corners of the driving coil 225 are rounded to increase efficiency. According to experimental results, when the corners of the driving coils 225 are rounded, the power consumption of the driving coil 225 is reduced by 17% as compared with the case where the corners of the driving coil 225 are not rounded.

Figure 20A:
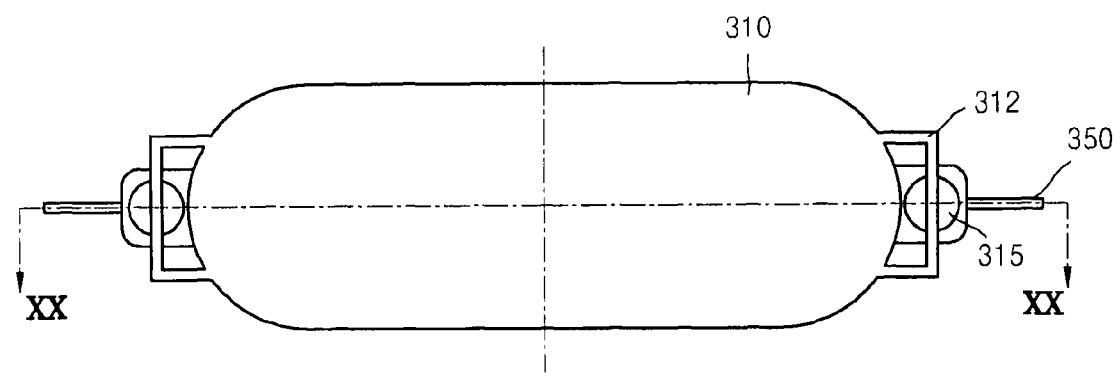
FIGS. 20A and 20B show a plan view of an MEMS device and a sectional view taken along line XX-XX of the plan view, according to another exemplary embodiment of the present invention.
Figure 20B:
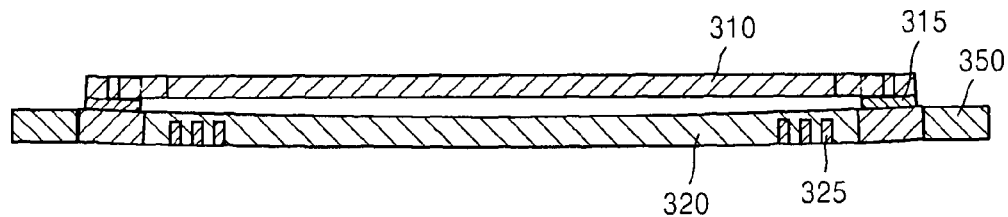

FIG. 20A shows a plan view of an MEMS device and a sectional view taken along line XX-XX of the plan view according to another exemplary embodiment of the present invention. Referring to FIG. 20A, the MEMS device includes a stage 310, a deformation absorbing springs 312 supporting both sides of the stage 310, a driving body 320 facing a bottom surface of the stage 310, and spacer columns 315 keeping the driving body 320 at a predetermined distance from the deformation absorbing springs 312. The deformation absorbing springs 312 is formed on both sides of the stage 310 to support the stage 310. The stage 310 is spaced a predetermined distance apart from the driving body 320. The deformation absorbing springs 312 has a thin ring shape suitable for elastic deformation. While being elastically deformed, the deformation absorbing springs 312 keeps the stage 310 flat. The spacer columns 315 keep the stage 310 and the driving boy 320 at a predetermined distance from each other. The driving body 320 provides a rotation force to the stage 310. For this, a driving coil 325 having a predetermined pattern is formed on a bottom surface of the driving body 320. When a predetermined current is applied to the driving coil 325, the driving body 320 and the stage 310 coupled to the driving body 320 are rotated about an axle 350 by the interaction between the applied current and a magnetic field formed by magnets (not shown). Here, the driving coil 325 is heated and expanded due to its electric resistance, thereby causing upward deflection of the driving body 320 as shown in FIG. 20B. However, since the stage 310 is spaced a predetermined distance apart from the driving body 320, the stage 310 can be kept flat without interfering with the driving body 320. Furthermore, while being elastically deformed, the deformation absorbing springs 312 absorbs the bending stress transmitted from the driving body 320 through the spacer columns 315, thereby preventing the deformation of the stage 310.

According to the MEMS device of the exemplary embodiments of the present invention, the stage having the light reflecting surface is spaced a predetermined distance from the driving body providing a driving force, so that the flatness of the stage is not affected by the bending deformation of the driving body. Therefore, the MEMS device can perform scanning precisely in a desired direction.

Further, in the related art stage where both the light reflecting surface and the driving coil are formed, the driving coil is inevitably formed around the light reflecting surface, thereby decreasing the driving efficiency of the MEMS device. However, in the exemplary embodiments of the present invention, since the driving coil is formed at the additional driving body, the driving coil can be located inside the light reflecting surface of the stage, thereby increasing the driving efficiency of the MEMS device.

Furthermore, the MEMS device according to the exemplary embodiments of the present invention can include the capacitive sensor. Therefore, the rotation speed and direction of the stage can be precisely measured. For example, when the capacitive sensor is applied to an MEMS device used for an optical scanner, a stage can be precisely controlled and thus a high-resolution display device can be provided.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A micro electro mechanical system (MEMS) device comprising:
a stage which operates in a vibration mode;
an axle which supports the stage and allows rotation of the stage; and
a capacitive sensor which detects a rotational state of the stage,
wherein the capacitive sensor comprises:
a sensing arm which extends from an end of the stage in parallel with the axle, the sensing arm being spaced a distance from the axle;
a plurality of driving combs which extend from the sensing arm in a direction crossing the axle, the driving combs being rotated together with the stage;
a plurality of fixed combs which are arranged in parallel with each other and fixedly supported for engagement with the driving combs, the fixed combs including surfaces overlapping opposite surfaces of the driving combs in accordance with a rotation of the driving combs; and
a capacitance sensing portion which detects a capacitance change of the driving combs and the fixed combs via the overlapping surfaces of the driving combs and the fixed combs.

2. The MEMS device of claim 1, further comprising:
a driving coil which is wound along an edge of the stage; and
magnets which is disposed at both sides of the stage for forming a magnetic field across the driving coil.

3. A micro electro mechanical system (MEMS) device comprising:
a stage which operates in a vibration mode;
an axle which supports the stage and allows rotation of the stage; and
a capacitive sensor which detects a rotational state of the stage,
wherein the capacitive sensor comprises:
a first sensing arm and a second sensing arm which extend from the stage in parallel with the axle, the first and second sensing arms being spaced a distance from the axle in opposite directions;
a plurality of driving combs which extend from each of the first and second sensing arms in a direction crossing the axle, the driving combs being rotated together with the stage;
a plurality of fixed combs which are arranged in parallel with each other and fixedly supported for engagement with the driving combs, the fixed combs including surfaces overlapping opposite surfaces of the driving combs in accordance with the rotation of the driving combs; and
a capacitance sensing portion which detects a capacitance change of the driving combs and the fixed combs via the overlapping surfaces of the driving combs and the fixed combs.

4. The MEMS device of claim 3, wherein if the stage is in a horizontal position, the fixed combs and the driving combs face each other at a same height and overlap each other to a maximum level,
and if the stage and the driving combs are rotated, an overlapping area between the fixed combs and the driving combs decreases.

5. The MEMS device of claim 3, wherein if the stage is in a horizontal position, the fixed combs and the driving combs are located at different heights,
and if the stage and the driving combs are rotated together, the driving combs of the first sensing arm or the second sensing arm overlap corresponding fixed combs according to a rotational direction of the stage and the driving combs.

6. The MEMS device of claim 3, wherein if the stage is in a horizontal position, the driving combs of the first sensing arm are located at a different height from the fixed combs corresponding to the driving combs of the first sensing arm, and the driving combs of the second sensing arm are located at a same height as the fixed combs corresponding to the driving combs of the second sensing arm.

7. A micro electro mechanical system (MEMS) device comprising:
a stage which operates in a vibration mode;
a driving body which is rotatably disposed to upwardly or downwardly face the stage;
a spacer column which is disposed between the stage and the driving body to maintain the stage and the driving body at a distance from each other;
a driving coil which is wound along an edge of the driving body; and
a magnet which forms a magnetic field across the driving coil,
wherein the spacer column separates the stage and the driving body along a direction perpendicular to a plane of the driving coil.

8. The MEMS device of claim 7, wherein the spacer column comprises a supporting surface which supports the stage, the supporting surface being smaller than the stage.

9. The MEMS device of claim 7, wherein the spacer column is aligned with a center of the stage.

10. The MEMS device of claim 7, further comprising one or more additional spacer columns which are symmetrically arranged with respect to a center of the stage.

11. The MEMS device of claim 7, wherein the driving coil is rounded at corners.

12. A micro electro mechanical system (MEMS) device comprising:
a stage which operates in a vibration mode;
a driving body which is rotatably disposed to upwardly or downwardly face the stage;
a spacer column which is disposed between the stage and the driving body to maintain the stage and the driving body at a distance from each other;
a driving coil which is wound along an edge of the driving body; and
a magnet which forms a magnetic field across the driving coil,
wherein the spacer column is aligned with a center of the stage, and
wherein the driving body comprises:
a center region to which the spacer column is coupled;
an outer region which surrounds the center region; and
a circular opening which is provided between the center region and the outer region so as to prevent a thermal deformation from propagating between the center region and the outer region.

13. A micro electro mechanical system (MEMS) device comprising:
a stage which operates in a vibration mode;
an axle which supports the stage and allows rotation of the stage; and
a magnet which provides a magnetic field for the stage, wherein the stage comprises:

a silicon layer which forms a body of the stage;

a reflective metal layer which is disposed on the silicon layer as a reflecting surface and has a first thermal expansion coefficient;

a driving coil pattern formed in a bottom surface of the silicon layer; and an insulating layer which insulates the driving coil pattern by covering the bottom surface of the silicon layer and exposed portions of the driving coil pattern, the insulating layer having a second thermal expansion coefficient, wherein the first thermal expansion coefficient is larger than the second thermal expansion coefficient.

14. The MEMS device of claim 13, wherein the reflective metal layer comprises an aluminum layer, and the insulating layer comprises a silicon oxide layer.

15. The MEMS device of claim 13, further comprising a coil insulating layer which corresponds to the driving coil pattern and is disposed between the silicon layer and the driving coil pattern.

16. The MEMS device of claim 13, wherein the driving coil pattern is rounded at corners.

* * * * *